US010257188B2

(12) United States Patent
Anand et al.

(10) Patent No.: US 10,257,188 B2
(45) Date of Patent: *Apr. 9, 2019

(54) OFFLINE ACCESS CONTROL FOR AN APPLICATION

(71) Applicant: ROCKWELL AUTOMATION TECHNOLOGIES, INC., Mayfield Heights, OH (US)

(72) Inventors: Ashish Anand, Mayfield Heights, OH (US); Kyle Reissner, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/693,860

(22) Filed: Sep. 1, 2017

(65) Prior Publication Data
US 2017/0366541 A1    Dec. 21, 2017

Related U.S. Application Data

(63) Continuation of application No. 14/700,378, filed on Apr. 30, 2015, now Pat. No. 9,756,041.

(51) Int. Cl.
H04L 29/06 (2006.01)
H04L 29/08 (2006.01)

(52) U.S. Cl.
CPC ........ H04L 63/0846 (2013.01); H04L 63/083 (2013.01); H04L 63/0807 (2013.01);
(Continued)

(58) Field of Classification Search
CPC ............ H04L 63/0846; H04L 63/0807; H04L 63/083; H04L 63/108; H04L 67/10; H04L 67/306
(Continued)

(56) References Cited

U.S. PATENT DOCUMENTS 7,024,556 B1    4/2006  Hadjinikitas et al.
8,887,230 B2 * 11/2014  Barton ................ H04L 41/046
                                                        726/1
(Continued)

FOREIGN PATENT DOCUMENTS

DE    10223551 A1    12/2003

OTHER PUBLICATIONS

European Search Report issued in EP Application No. 16167749.7-1870 dated Sep. 23, 2016, 8 pages.

*Primary Examiner* — Dant B Shaifer Harriman

(57) ABSTRACT

Techniques to facilitate offline access control for an application associated with an industrial automation environment are disclosed herein. In at least one implementation, a a user login prompt for the application is displayed on a display system of a computing system, wherein the user login prompt provides an offline access option for a user to request offline access to the application for a period of time. User login credentials are received along with a selection of the offline access option, which are transferred for delivery to an authentication server, wherein the authentication server authorizes the user for the offline access to the application for the period of time based on the user login credentials. An authentication response is received from the authentication server, wherein the authentication response instructs the application to authorize the user to operate the application for the period of time without requiring authorization from the authentication server.

20 Claims, 5 Drawing Sheets

(52) U.S. Cl.
CPC ............ *H04L 63/108* (2013.01); *H04L 67/10* (2013.01); *H04L 67/306* (2013.01)

(58) Field of Classification Search
USPC .......................................................... 726/7
See application file for complete search history.

(56) References Cited

U.S. PATENT DOCUMENTS

| | | | |
|---|---|---|---|
| 2006/0015725 A1* | 1/2006 | Voice | ................. H04L 63/0245 |
| | | | 713/168 |
| 2012/0297311 A1* | 11/2012 | Duggal | ................... G06F 9/468 |
| | | | 715/740 |
| 2013/0227676 A1 | 8/2013 | Guo et al. | |
| 2014/0282821 A1 | 9/2014 | Adler et al. | |
| 2016/0182489 A1* | 6/2016 | Lewis | ................. H04L 63/0815 |
| | | | 726/8 |

\* cited by examiner

US 10,257,188 B2

OFFLINE ACCESS CONTROL FOR AN APPLICATION

RELATED APPLICATIONS

This application is a continuation of—and claims priority to—U.S. application Ser. No. 14/700,378, filed on Apr. 30, 2015, and entitled "Offline Access Control for An Application," which is hereby incorporated by reference in its entirety.

TECHNICAL FIELD

Aspects of the disclosure are related to computing hardware and software technology.

TECHNICAL BACKGROUND

Software applications that run on computing systems commonly provide some type of user client interface to present information to the user and receive user inputs. Most applications also typically require a user to provide login credentials via the user interface in order to authenticate the user prior to using the application. For example, the application may request login information from the user, such as a username and password. After the user logs in, the application directs the computing system to transfer this user data over a communication network to a server for authentication. In response to the authentication request, the server verifies that the login information provided by the user is valid, and responds with an indication that the user is authenticated and authorized to utilize the application. The application then allows the user to access the functionality provided by the application.

Most applications typically require server authentication each time they are launched by a user. For example, even if an application stores the user's credentials, the application requires a data connection over a network in order to connect to a server, transfer the credentials, and re-authenticate the user for the application. If the computing system does not have access to the authenticating server when the user attempts to open the application, the user is prevented from utilizing the application until a connection with the server is established and the user is authenticated.

OVERVIEW

Techniques to facilitate offline access control for an application associated with an industrial automation environment are disclosed herein. In at least one implementation, a user login prompt for the application is displayed on a display system of a computing system, wherein the user login prompt provides an offline access option for a user to request offline access to the application for a period of time. User login credentials are received along with a selection of the offline access option to request the offline access to the application for the period of time. The user login credentials and the selection of the offline access option are transferred for delivery to an authentication server, wherein the authentication server authorizes the user for the offline access to the application for the period of time based on the user login credentials. An authentication response is received from the authentication server, wherein the authentication response instructs the application to authorize the user to operate the application for the period of time without requiring authorization from the authentication server.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations disclosed herein provide for enabling an application to bypass server authentication for a specified period of time, thereby allowing a user to access the application even when network access is unavailable. Typically, most applications require server authentication every time a user launches the application, and if the application fails to contact the server, the application prevents the user from using the application. However, an application that is disabled due to an inability to connect to an authenticating server poses a problem for some users, such as technicians in the field who may require the use of some features of the application but are not within range of a data network connection. The techniques disclosed herein facilitate offline access for an application for a specified time period before requiring another server authentication.

In at least one implementation, a computing system displays a user login prompt for an application on a display system along with an option for a user to request offline access to the application for a period of time. The request for offline access is transferred to an authentication server along with user login credentials, and the server determines if the user is authorized for offline access for the time period requested. If authorized, the server returns an indication of approval back to the application, such as a timed-duration token that enables the user to operate the application in a disconnected state for the authorized period of time. Once the time period expires, the application requires server authentication to be performed again before the user can continue using the application.

Figure 1:
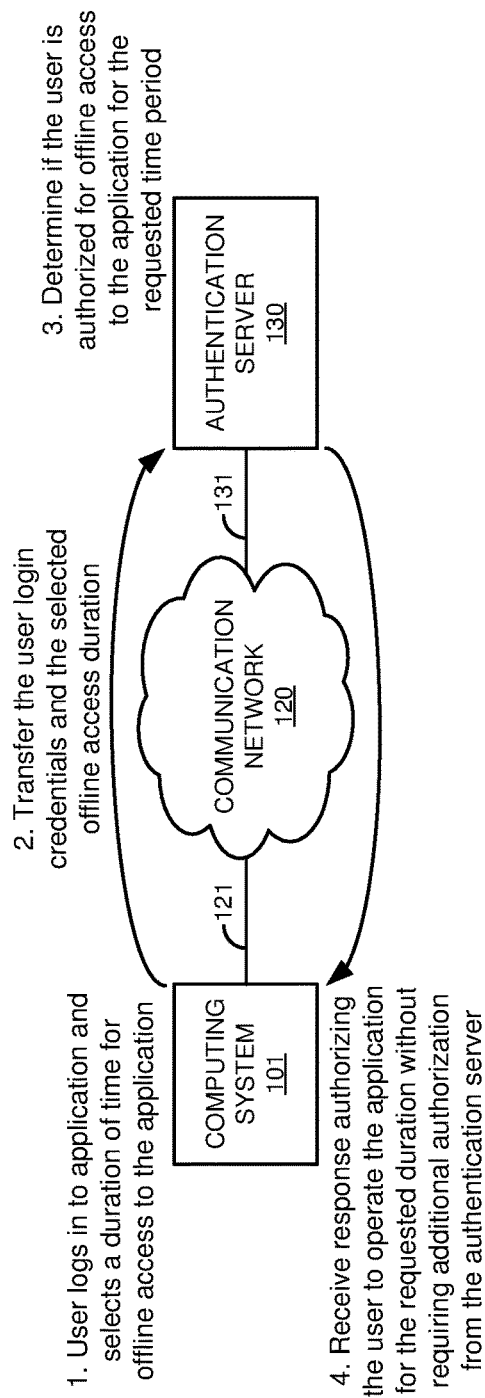
FIG. 1 is a block diagram that illustrates an operation of a communication system in an exemplary implementation.
Figure 2:
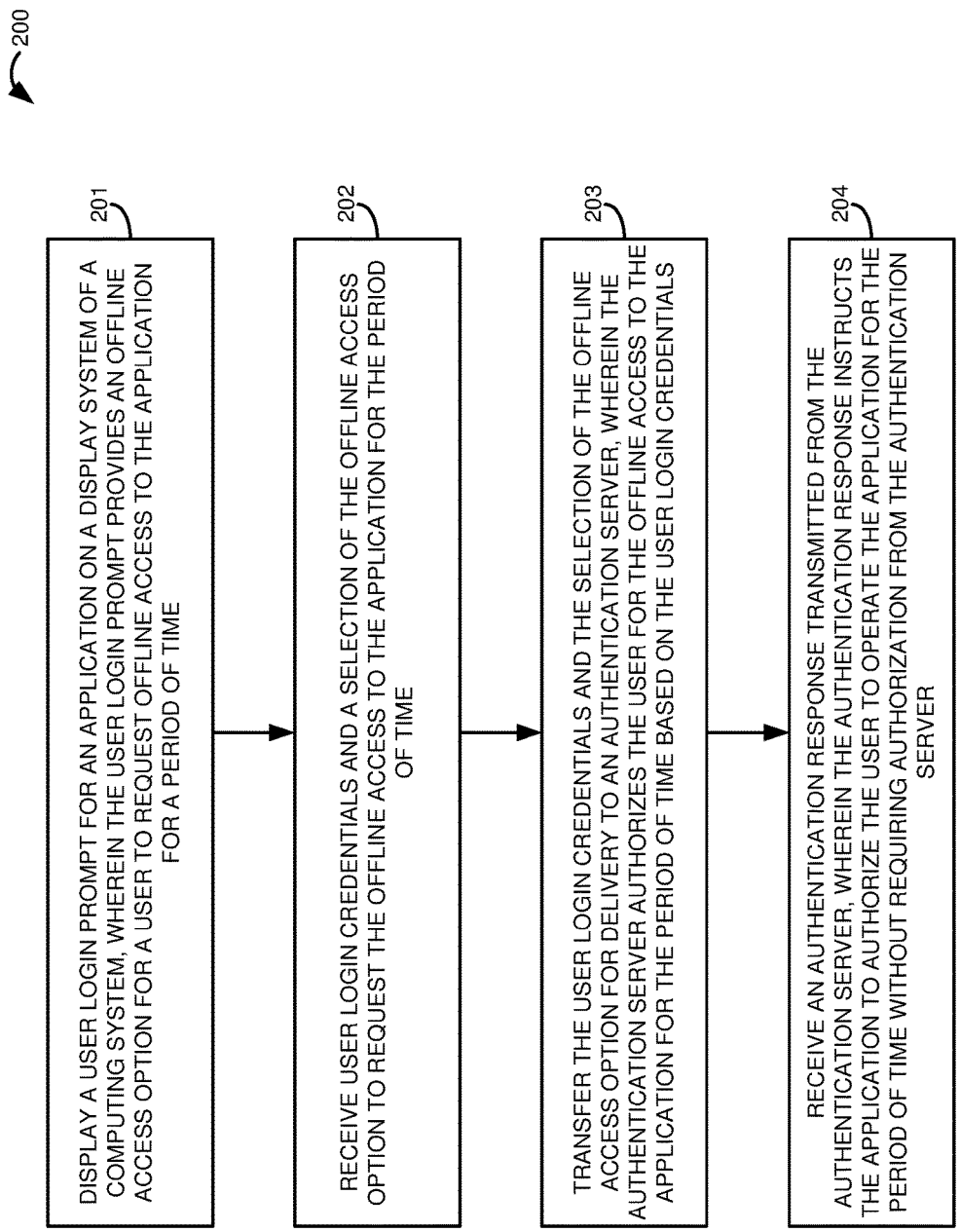
FIG. 2 is a flow diagram that illustrates an operation of a computing system in an exemplary implementation.
Figure 3:
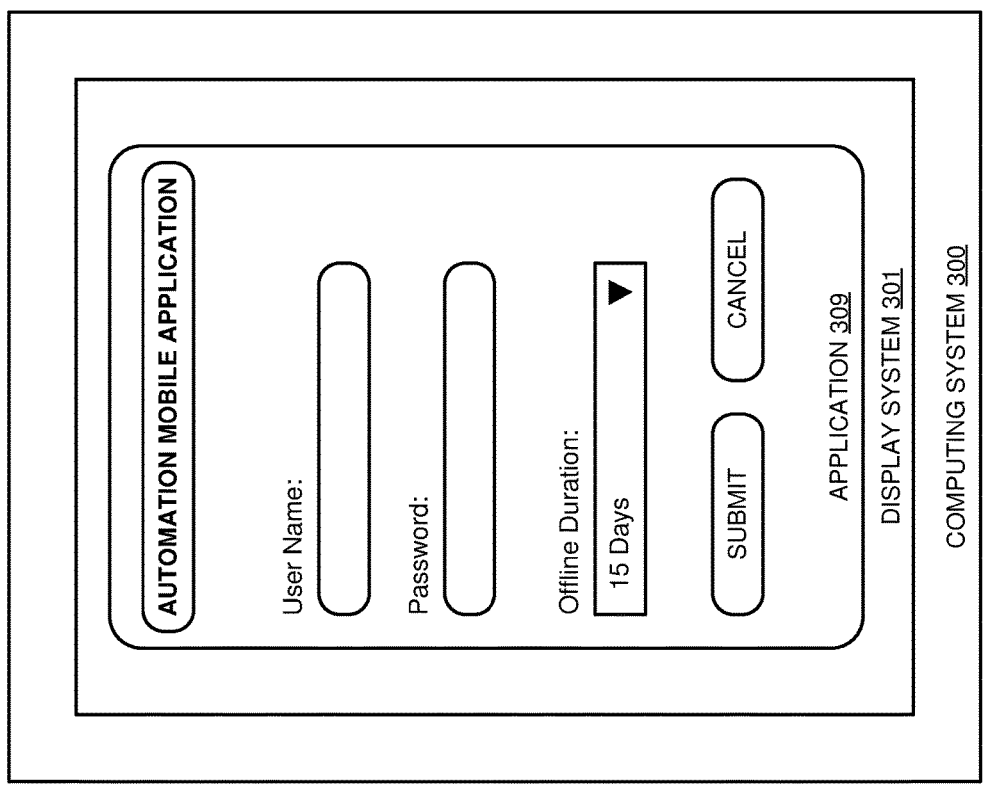
FIG. 3 is a block diagram that illustrates an application displayed on a display system of a computing system in an exemplary implementation.
Figure 4:
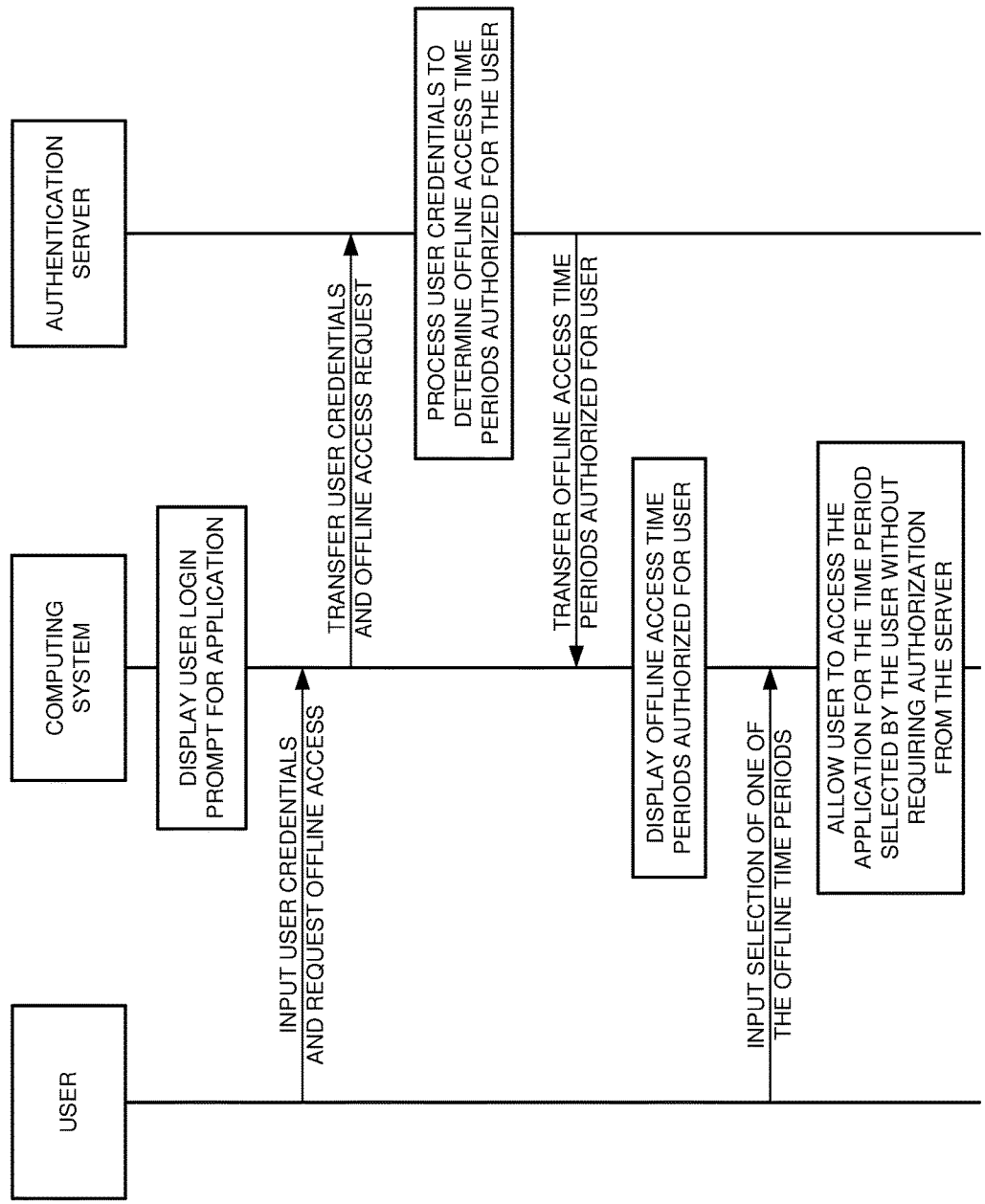
FIG. 4 is a sequence diagram that illustrates an operational scenario of a communication system in an exemplary implementation.
Figure 5:
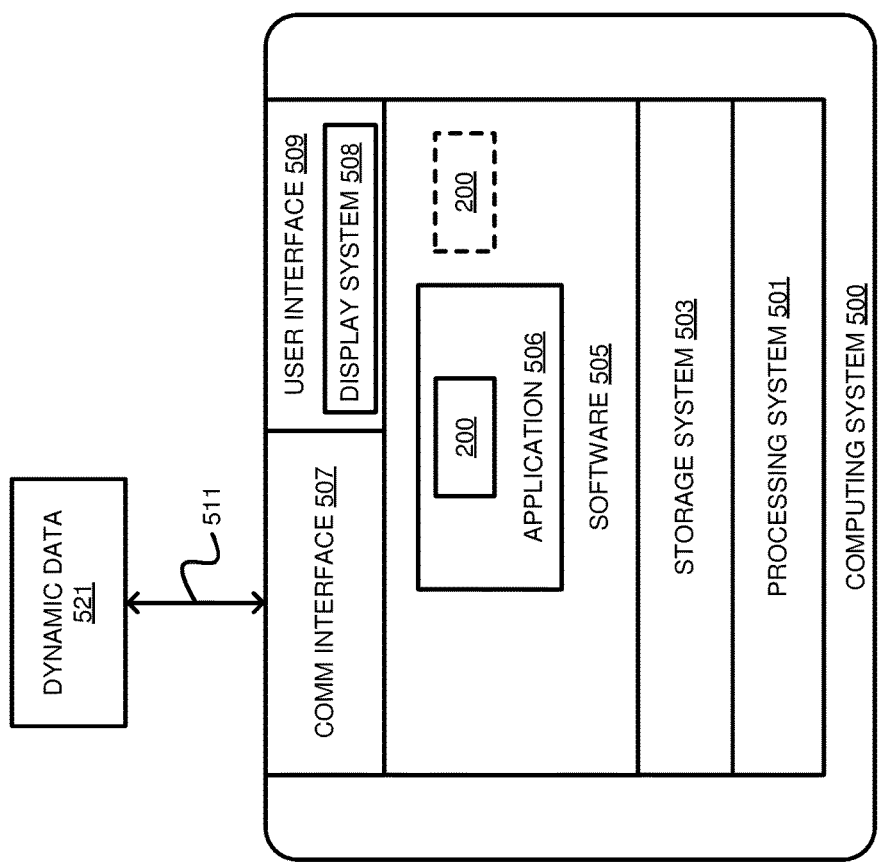
FIG. 5 is a block diagram that illustrates a computing system in an exemplary implementation.

Referring now to the drawings, FIG. 1 illustrates a communication system and an operational scenario in which a user interacts with an application executing on a computing system in order to request and receive time-limited offline access to the application from an authentication server. FIG. 2 illustrates an offline access process that may be performed by a computing system. FIG. 3 illustrates an exemplary graphical user interface of an application executing on a computing system from which a user may request temporary offline access to the application. FIG. 4 illustrates an operational scenario involving a computing system and an authentication server that may be used to authorize a user for various time periods of offline access to an application in an exemplary implementation. FIG. 5 illustrates an exemplary computing system that may be used to perform any of the offline access processes and operational scenarios described herein.

Turning now to FIG. 1, an operational scenario of communication system 100 is illustrated in an exemplary implementation. Communication system 100 includes computing system 101, communication network 120, and authentication server 130. Computing system 101 and communication network 120 communicate over communication link 121, while communication network 120 and authentication server 130 are in communication over communication link 131.

An exemplary operation of communication system 100 is illustrated in FIG. 1, the order of which is designated by the numerals 1 through 4 in this example, but note that the steps could be performed in any order for any operation described herein. Initially, a user launches an application that was previously installed on computing system 101. The application requires user authentication prior to allowing the user to access the functionality provided by the application. Thus, the user is presented with a login prompt for entering user credentials. In this example, in addition to the login prompt, the user is presented with an option to select a time period for offline access to the application. Accordingly, the user logs in to the application and selects a duration of time for offline access to the application, such as five days. Computing system 101 then transfers the user login credentials and the selected offline access duration to authentication server 130 via communication network 120.

Authentication server 130 receives the user credentials and the selected duration for offline access to the application. Authentication server 130 uses this information to determine if the user is authorized for offline access to the application for the requested duration. A response is then transferred from authentication server 130 to computing system 101 via communication network 120 to indicate whether or not the user is authorized for offline access to the application for the requested duration. In this example, computing system 101 receives a response authorizing the user to operate the application for the requested duration without requiring additional authorization from authentication server 130 until expiration of the time period. Another exemplary operation of computing system 101 will now be described in greater detail with respect to FIG. 2.

FIG. 2 is a flow diagram that illustrates an operation 200 of a computing system in an exemplary implementation. The operation 200 shown in FIG. 2 may also be referred to as offline access process 200 herein. The steps of the operation are indicated below parenthetically. The following discussion of operation 200 will proceed with reference to computing system 101 and authentication server 130 of FIG. 1 in order to illustrate its operations, but note that the details provided in FIG. 1 are merely exemplary and not intended to limit the scope of process 200 to the specific implementation shown in FIG. 1.

Operation 200 may be employed to operate a computing system to facilitate offline access control for an application associated with an industrial automation environment. However, operation 200 could also be employed by a computing system to facilitate offline access control for any software application irrespective of its purpose or functionality, including a website or webpages provided by a server for viewing in a web browser, mobile applications for execution on a mobile device, editing and design tools, media players, simulation software, or any other application.

As shown in the operational flow of process 200, a user login prompt for an application is displayed on a display system of computing system 101, wherein the user login prompt provides an offline access option for a user to request offline access to the application for a period of time (201). Typically, a user is required to log in to the application so that the user can be authenticated and authorized to use the application. Therefore, the application presents a user login prompt in order to receive user credentials from the user through a user input mechanism of computing system 101. In this example, the user is also presented with an offline access option, which enables the user to request offline access to the application for a period of time.

Computing system 101 receives user login credentials and a selection of the offline access option to request the offline access to the application for the period of time (202). As discussed above, the user typically provides user input into the computing system in order to provide the user login credentials and the selection of the offline access option. The user login credentials typically comprise unique user information that may be used by authentication server 130 to authenticate the user for authorized use of the application, such as a username and password or the like. The user may indicate the period of time requested for the offline access to the application in several ways. In at least one implementation, the user may manually enter a duration of time into the user interface of the application. Additionally or alternatively, the offline access option could comprise one or more time periods for selection by the user. For example, the user could be presented with a drop-down menu, radio buttons, or any other user interface mechanism to select between various time periods for offline access. In at least one implementation, the time periods for offline access could be set by default for each application on an application-by-application basis. To be clear, note that the user may only be authorized for a single time period of offline access, such as when a contract with the user dictates that the user is only entitled to a certain time of offline access. In this case, the user would not select from several time periods when selecting the offline access option, but would simply provide the selection of the offline access option to request the offline access to the application for the one authorized time period. In some examples, the time period selection portion of the user interface could be turned to a static value in this case, or would only allow selection of the single time period authorized for the user, or a time period selector may not even be displayed, and the user merely selects the offline access option and the time period is implicit because there is only one time period that the user is permitted for offline access to the application.

In some implementations, the one or more time periods for the offline access option could be provided by authentication server 130 based on the user login credentials. For example, users could have different offline access permissions or licensing terms that dictate which time periods are authorized for each user, and authentication server 130 could populate these time periods for the user based on the user login credentials. Therefore, some implementations could involve computing system 101 sending the user login credentials, or at least a user identifier, to authentication server 130 in order to receive the approved time periods for the user from server 130 in order to present the offline access option to the user with the appropriate time periods. In at least one implementation, the application could store these user-specific time periods that were previously provided by authentication server 130 in a local storage device of computing system 101 for each user that has accessed the application. In this manner, the application could retrieve the approved list of time periods for a particular user from local storage based on a user identifier and present these time periods to the user with the offline access option.

Computing system 101 transfers the user login credentials and the selection of the offline access option for delivery to authentication server 130, wherein authentication server 130 authorizes the user for the offline access to the application for the period of time based on the user login credentials (203). In some examples, authentication server 130 could comprise a system located on-premise and accessible over a local network connection, or running in a cloud-based environment accessed over a wide area network such as the Internet, or any other deployment scheme, including combinations thereof. In some implementations, authentication server 130 or at least its functionality could be included within computing system 101, so that establishing a network connection to reach server 130 would be unnecessary. Typically, authentication server 130 processes the user credentials to verify the user's login information, and then checks that the user is authorized for offline access to the application for the period of time requested. For example, authentication server 130 could query a database that stores various time periods of offline access that are authorized for the user in order to determine if the user is authorized for the requested period of time. If the user requests a time period for offline access for which the user is not authorized, authentication server 130 will deny the offline access request for that time period. In some implementations, the time periods authorized for a user for offline access to an application could be based on the user's worker role in an industrial enterprise. Further, there may be some users who are not authorized for offline access to an application for any duration of time, and will thus require authorization from authentication server 130 for every attempt to utilize the application.

Computing system 101 receives an authentication response transmitted from authentication server 130, wherein the authentication response instructs the application to authorize the user to operate the application for the period of time without requiring authorization from authentication server 130 (204). Typically, the offline access to the application for the period of time comprises user access to at least some functionality of the application without requiring authorization from authentication server 130 for the period of time selected by the user. In at least one implementation, the authentication response that instructs the application to authorize the user to operate the application for the period of time could comprise instructions to direct the application to authorize the user to operate functions of the application that the user is entitled to access for the period of time. For example, the user identifier, worker role of the user, contract terms, and other factors could be used to determine which features of the application should be enabled or disabled for the user during offline access to the application, which could be communicated to computing system 101 in the authentication response. In some implementations, the authentication response could comprise a timed-duration token that enables the user to operate the application without requiring authorization from authentication server 130 for the period of time selected by the user. After the period of time expires, the user is typically prevented from operating the application until the application is able to access authentication server 130 over communication network 120 and receive renewed authorization for the user to access the application transmitted from authentication server 130.

Advantageously, a user may request offline access to an application for a period of time, enabling the user to operate the application without a network connection for the duration of the time period. In this manner, the user can still utilize the application in areas with no network connectivity during the authorized time period. This technique allows for contract-based time periods of authorized use, which may be enforced in the application for subscriptions and other restricted usage. Further, because the user is only afforded offline access to the application for a limited duration, the user is forced to re-authenticate after the authorized time period expires, at which time telemetry data and other information collected by the application can be uploaded to the server, and new updates for the application can be downloaded and installed, thereby ensuring that the application will at least be periodically updated. An example of a graphical user interface provided by an automation mobile application that illustrates one possible implementation of the techniques disclosed herein will now be discussed with respect to FIG. 3.

FIG. 3 is a block diagram that illustrates application 309 displayed on display system 301 of computing system 300 in an exemplary implementation. In this example, application 309 comprises an automation mobile application for use on a mobile device such as a smartphone, tablet, or laptop.

When a user first launches the automation mobile application 309, the user is presented with a user login screen as shown on display system 301. The user login screen provides fields for the user to enter credentials for logging in to the application, which in this case are a user name and password. The login screen for the application 309 also provides a drop-down menu for the user to request an offline duration, which represents a period of time that the user desires to utilize the application before the application requires another login to the server. For example, the user could select an offline duration time period from the drop-down menu of 15, 30, 45, or 90 days. The user credentials and the desired offline duration could then be sent over a network to a server, which could be on-premise or in the cloud, to verify that the user is authorized to access the application for the requested time period. An exemplary operation describing how a computing system might receive the various offline time periods to display to a user will now be discussed with respect to FIG. 4.

FIG. 4 is a sequence diagram that illustrates an operational scenario of a communication system in an exemplary implementation. The sequence diagram shows a user interacting with an application executing on a computing system, and the computing system interacting with an authentication server. Initially, the user launches an application that is installed on the computing system (not shown). When the application loads, it instructs the computing system to display a user login prompt on a display system. In this example, the user login prompt also provides an option to request offline access, but no time periods for offline access are initially presented to the user. Instead, the option to request offline access is provided for use as a signal to the authentication server that the user desires offline access to the application, and that offline access time periods for the user need to be determined and returned to the computing system.

The user enters the user credentials and selects the option to request offline access for the application. The application directs the computing system to transfer the user credentials and the offline access request to the authentication server. As discussed above, the offline access request signals to the authorization server that the user desires to operate the application in an offline state, and that authorized time periods for the offline access are needed for the user. Therefore, in response to receiving the offline access request, the authentication server processes the user credentials to determine a set of offline access time periods authorized for the user. The user could have different authorized time periods for offline access based on several factors, including individual permission settings, worker role at an enterprise, contract agreements, licensing terms, or any other considerations. Once the time periods are determined, the authentication server transfers the offline access time periods authorized for the user to the computing system.

Upon receipt of the authorized time periods, the application instructs the computing system to display the offline access time periods to the user. The user selects from the list of available offline time periods so that the application can be utilized for the duration of the selected time period without having to re-authenticate with the authentication server over a data network. The application may store the list of available offline time periods locally so that the time periods do not have to be requested from the authentication server again in the future, and the application can simply display the stored time periods to the user. In cases where the user is unauthorized for offline access and no time periods are returned, the application informs the user that offline access is unavailable.

Once the time period expires, the application requires the server authentication again before allowing the user to continue using the application. This forced re-authentication requirement enables data collected by the application to be uploaded to the server on a periodic basis, and enables the server to transfer updates to the application whenever the application contacts the server for renewed authentication. Further, if cloud-based authentication is required upon the expiration of every time period, vendors can more accurately measure active users on a weekly or monthly basis. In addition to licensing all of the functionality provided by the entire application, vendors may also offer varying levels of subscriptions for different features or modules of the application that may be accessed by a user while utilizing the application offline. Usage rights for offline access also allow for control over which users have access to what features and functionality of the application when operating the application offline. These abilities provide vendors, administrators, and other users with increased flexibility and control over how and when applications are used.

Referring back to FIG. 1, computing system 101 comprises a processing system and communication transceiver. Computing system 101 may also include other components such as a user interface, data storage system, and power supply. Computing system 101 may reside in a single device or may be distributed across multiple devices. Examples of computing system 101 include mobile computing devices, such as cell phones, tablet computers, laptop computers, notebook computers, and gaming devices, as well as any other type of mobile computing devices and any combination or variation thereof. Examples of computing system 101 also include desktop computers, server computers, and virtual machines, as well as any other type of computing system, variation, or combination thereof. In some implementations, computing system 101 could comprise a mobile device capable of operating in a server-like fashion which, among other uses, could be utilized in a wireless mesh network.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, asynchronous transfer mode (ATM) networks, packet networks, wireless mesh networks (WMN), local area networks (LAN), metropolitan area networks (MAN), wide area networks (WAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, peer-to-peer networking over Bluetooth, Bluetooth low energy, Wi-Fi Direct, near field communication (NFC), or some other communication format, including combinations thereof. In some examples, communication network 120 includes further access nodes and associated equipment for providing communication services to several computer systems across a large geographic region.

Authentication server 130 may be representative of any computing apparatus, system, or systems on which the techniques disclosed herein or variations thereof may be suitably implemented. Authentication server 130 comprises a processing system and communication transceiver. Authentication server 130 may also include other components such as a router, server, data storage system, and power supply. Authentication server 130 may reside in a single device or may be distributed across multiple devices. Authentication server 130 may be a discrete system or may be integrated within other systems, including other systems within communication system 100 or an automation control system. Some examples of authentication server 130 include desktop computers, server computers, cloud computing platforms, and virtual machines, as well as any other type of computing system, variation, or combination thereof. In some examples, authentication server 130 could comprise a programmable logic controller (PLC), programmable automation controller (PAC), network switch, router, switching system, packet gateway, authentication, authorization, and accounting (AAA) server, billing system, network gateway system, Internet access node, application server, database system, service node, firewall, or some other communication system, including combinations thereof. In some implementations, a PLC, PAC, and/or specific modules within the PLC rack could be used as authentication points and provide some or all of the functionality described herein for authentication server 130.

Communication links 121 and 131 use metal, air, space, optical fiber such as glass or plastic, or some other material as the transport medium—including combinations thereof. Communication links 121 and 131 could use various communication protocols, such as TDM, IP, Ethernet, telephony, optical networking, hybrid fiber coax (HFC), communication signaling, wireless protocols, or some other communication format, including combinations thereof. Communication links 121 and 131 could be direct links or may include intermediate networks, systems, or devices.

Turning now to FIG. 5, a block diagram is shown that illustrates computing system 500 in an exemplary implementation. Computing system 500 provides an example of computing system 101 or any computing system that may be used to execute offline access process 200 or variations thereof, although such systems could use alternative configurations. Computing system 500 includes processing system 501, storage system 503, software 505, communication interface 507, and user interface 509. User interface 509 comprises display system 508. Software 505 includes application 506 which itself includes offline access process 200. Offline access process 200 may optionally be implemented separately from application 506.

Computing system 500 may be representative of any computing apparatus, system, or systems on which application 506 and offline access process 200 or variations thereof may be suitably implemented. Examples of computing system 500 include mobile computing devices, such as cell phones, tablet computers, laptop computers, notebook computers, and gaming devices, as well as any other type of mobile computing devices and any combination or variation thereof. Note that the features and functionality of computing system 500 may apply as well to desktop computers, server computers, and virtual machines, as well as any other type of computing system, variation, or combination thereof.

Computing system 500 includes processing system 501, storage system 503, software 505, communication interface 507, and user interface 509. Processing system 501 is operatively coupled with storage system 503, communication interface 507, and user interface 509. Processing system 501 loads and executes software 505 from storage system 503. When executed by computing system 500 in general, and processing system 501 in particular, software 505 directs computing system 500 to operate as described herein for offline access process 200 or variations thereof. Computing system 500 may optionally include additional devices, features, or functionality not discussed herein for purposes of brevity.

Referring still to FIG. 5, processing system 501 may comprise a microprocessor and other circuitry that retrieves and executes software 505 from storage system 503. Processing system 501 may be implemented within a single processing device but may also be distributed across multiple processing devices or sub-systems that cooperate in executing program instructions. Examples of processing system 501 include general purpose central processing units, application specific processors, and logic devices, as well as any other type of processing device, combinations, or variations thereof.

Storage system 503 may comprise any computer readable media or storage media readable by processing system 501 and capable of storing software 505. Storage system 503 may include volatile and nonvolatile, removable and non-removable media implemented in any method or technology for storage of information, such as computer readable instructions, data structures, program modules, or other data. Storage system 503 may be implemented as a single storage device but may also be implemented across multiple storage devices or sub-systems co-located or distributed relative to each other. Storage system 503 may comprise additional elements, such as a controller, capable of communicating with processing system 501. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 509, processing system 501 loads and executes portions of software 505, such as offline access process 200, to render a graphical user interface for application 506 for display by display system 508 of user interface 509. Software 505 may be implemented in program instructions and among other functions may, when executed by computing system 500 in general or processing system 501 in particular, direct computing system 500 or processing system 501 to display a user login prompt for application 506 on display system 508 of computing system 500, wherein the user login prompt provides an offline access option for a user to request offline access to application 506 for a period of time. Software 505 may further direct computing system 500 or processing system 501 to receive user login credentials and a selection of the offline access option to request the offline access to application 506 for the period of time. In addition, software 505 directs computing system 500 or processing system 501 to transfer the user login credentials and the selection of the offline access option for delivery to an authentication server, wherein the authentication server authorizes the user for the offline access to application 506 for the period of time based on the user login credentials. Finally, software 505 may direct computing system 500 or processing system 501 to receive an authentication response transmitted from the authentication server, wherein the authentication response instructs application 506 to authorize the user to operate application 506 for the period of time without requiring authorization from the authentication server.

Software 505 may include additional processes, programs, or components, such as operating system software or other application software. Examples of operating systems include Windows®, iOS®, and Android®, as well as any other suitable operating system. Software 505 may also comprise firmware or some other form of machine-readable processing instructions executable by processing system 501. In general, software 505 may, when loaded into processing system 501 and executed, transform computing system 500 overall from a general-purpose computing system into a special-purpose computing system customized to facilitate offline access control for an application as described herein for each implementation.

Communication interface 507 may include communication connections and devices that allow for communication between computing system 500 and other computing systems (not shown) or services, over a communication network 511 or collection of networks. In some implementations, communication interface 507 receives dynamic data 521 over communication network 511. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 509 may include a voice input device, a touch input device for receiving a gesture from a user, a motion input device for detecting non-touch gestures and other motions by a user, and other comparable input devices and associated processing elements capable of receiving user input from a user. Output devices such as display system 508, speakers, haptic devices, and other types of output devices may also be included in user interface 509. The aforementioned user input devices are well known in the art and need not be discussed at length here. User interface 509 may also include associated user interface software executable by processing system 501 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. One or more computer-readable storage media having program instructions stored thereon to facilitate offline access control for an application associated with an industrial automation environment, wherein the program instructions, when executed by a computing system, direct the computing system to at least:
    display an offline access option for a user to request offline access to the application;
    receive user login credentials and a selection of the offline access option to request the offline access to the application;
    transfer the user login credentials and the selection of the offline access option for delivery to an authentication server;
    receive an authentication response transmitted from the authentication server that instructs the application to provide a plurality of time periods in which the user is allowed to operate the application offline and indicates which features of the application to enable, wherein the authentication response comprises the plurality of time periods;
    display the plurality of time periods to the user only after receiving the authentication response from the authentication server; and
    in response to a user selection of one of the plurality of time periods, allow the user offline access to the enabled features of the application.

2. The one or more computer-readable storage media of claim 1 wherein the offline access to the application for the time period selected by the user comprises user access to at least some functionality of the application without requiring authorization from the authentication server for the time period selected by the user.

3. The one or more computer-readable storage media of claim 1 wherein the authentication response comprises a timed-duration token that enables the user to operate the application without requiring authorization from the authentication server for the time period selected by the user.

4. The one or more computer-readable storage media of claim 1 wherein the program instructions further direct the computing system to, after the time period selected by the user expires, prevent the user from operating the application until the application is able to access the authentication server over a communication network and receive authorization for the user to access the application transmitted from the authentication server.

5. The one or more computer-readable storage media of claim 1 wherein the program instructions further direct the computing system to:
    display the plurality of time periods to the user; and
    allow the user to select the one of the plurality of time periods.

6. The one or more computer-readable storage media of claim 1 wherein the authentication server provides the plurality of time periods based on the user login credentials.

7. The one or more computer-readable storage media of claim 1 wherein the program instructions that direct the processing system to allow the user offline access to the enabled features the application comprise instructions that direct the processing system to allow the user to operate the features of the application offline for the time period selected by the user.

8. A method to facilitate offline access control for an application associated with an industrial automation environment, the method comprising:
    providing an offline access option for a user to request offline access to the application;
    receiving user login credentials and a selection of the offline access option to request the offline access to the application;
    transferring the user login credentials and the selection of the offline access option for delivery to an authentication server;
    receiving an authentication response transmitted from the authentication server instructing the application to provide a plurality of time periods in which the user is allowed to operate the application offline and indicating which features of the application to enable, wherein the authentication response comprises the plurality of time periods;

display the plurality of time periods to the user only after receiving the authentication response from the authentication server; and in response to a user selection of one of the plurality of time periods, allowing the user offline access to the enabled features of the application.

9. The method of claim 8 wherein the offline access to the application for the time period selected by the user comprises user access to at least some functionality of the application without requiring authorization from the authentication server for the time period selected by the user.

10. The method of claim 8 wherein the authentication response comprises a timed-duration token that enables the user to operate the application without requiring authorization from the authentication server for the time period selected by the user.

11. The method of claim 8 further comprising, after the time period selected by the user expires, preventing the user from operating the application until the application is able to access the authentication server over a communication network and receive authorization for the user to access the application transmitted from the authentication server.

12. The method of claim 8 further comprising:
displaying the plurality of time periods to the user; and
allowing the user to select the one of the plurality of time periods.

13. The method of claim 8 wherein allowing the user offline access to the enabled features the application comprises allowing the user to operate the features of the application that the user is entitled to access for the time period selected by the user.

14. An apparatus to facilitate offline access control for an application associated with an industrial automation environment, the apparatus comprising:
one or more computer-readable storage media; and
program instructions stored on the one or more computer-readable storage media that, when executed by a processing system, direct the processing system to at least:
display an offline access option for a user to request offline access to the application;
receive user login credentials and a selection of the offline access option to request the offline access to the application;
transfer the user login credentials and the selection of the offline access option for delivery to an authentication server;
receive an authentication response transmitted from the authentication server, wherein the authentication response comprises a plurality of offline time periods in which the user is allowed to operate the application offline and indicates which features of the application to enable, wherein the authentication response comprises the plurality of time periods;
display the plurality of time periods to the user only after receiving the authentication response from the authentication server;
receive a selection of one of the offline time periods of the plurality of offline time periods from the user; and
provide the user with offline access to the features of the application.

15. The apparatus of claim 14 wherein the offline access to the application for the selected time period comprises user access to at least some functionality of the application without requiring authorization from the authentication server for the duration of the selected offline time period.

16. The apparatus of claim 14 wherein the authentication response comprises a timed-duration token that enables the user to operate the application without requiring authorization from the authentication server for the duration of the selected offline time period.

17. The apparatus of claim 14 wherein the program instructions further direct the processing system to, after the duration of the selected offline time period expires, prevent the user from operating the application until the application is able to access the authentication server over a communication network and receive rePreviously Presenteded authorization for the user to access the application transmitted from the authentication server.

18. The apparatus of claim 14 wherein the program instructions further direct the processing system to
display the plurality of offline time periods to the user; and
allow the user to select the one of the plurality of offline time periods.

19. The apparatus of claim 18 wherein the authentication server provides the plurality of offline time periods based on the user login credentials.

20. The apparatus of claim 14 wherein the program instructions that direct the processing system to provide the user with offline access to the features the application comprise program instructions that direct the processing system to provide the user with offline access to the features the application for the duration of the selected offline time period.

* * * * *